Figure 10:
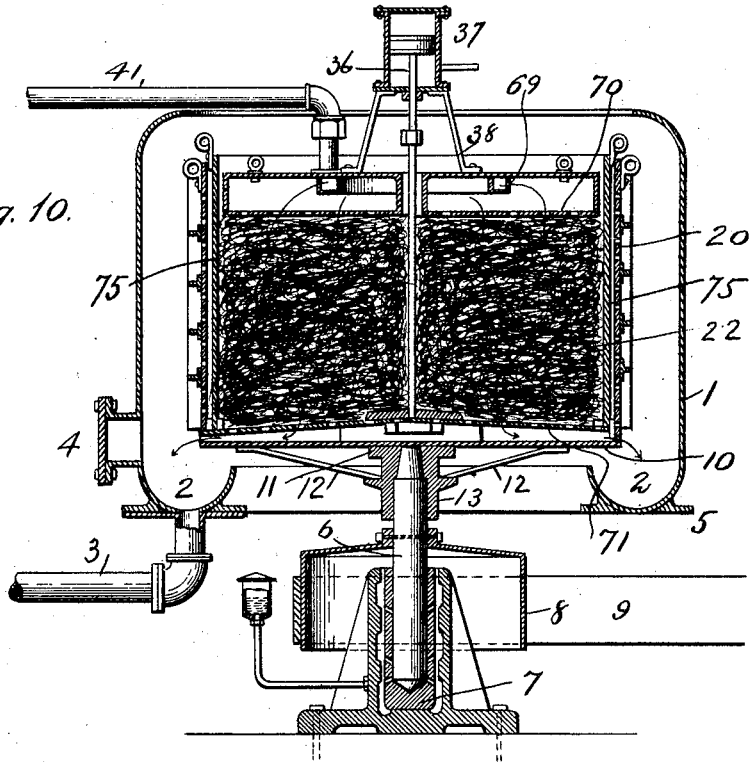

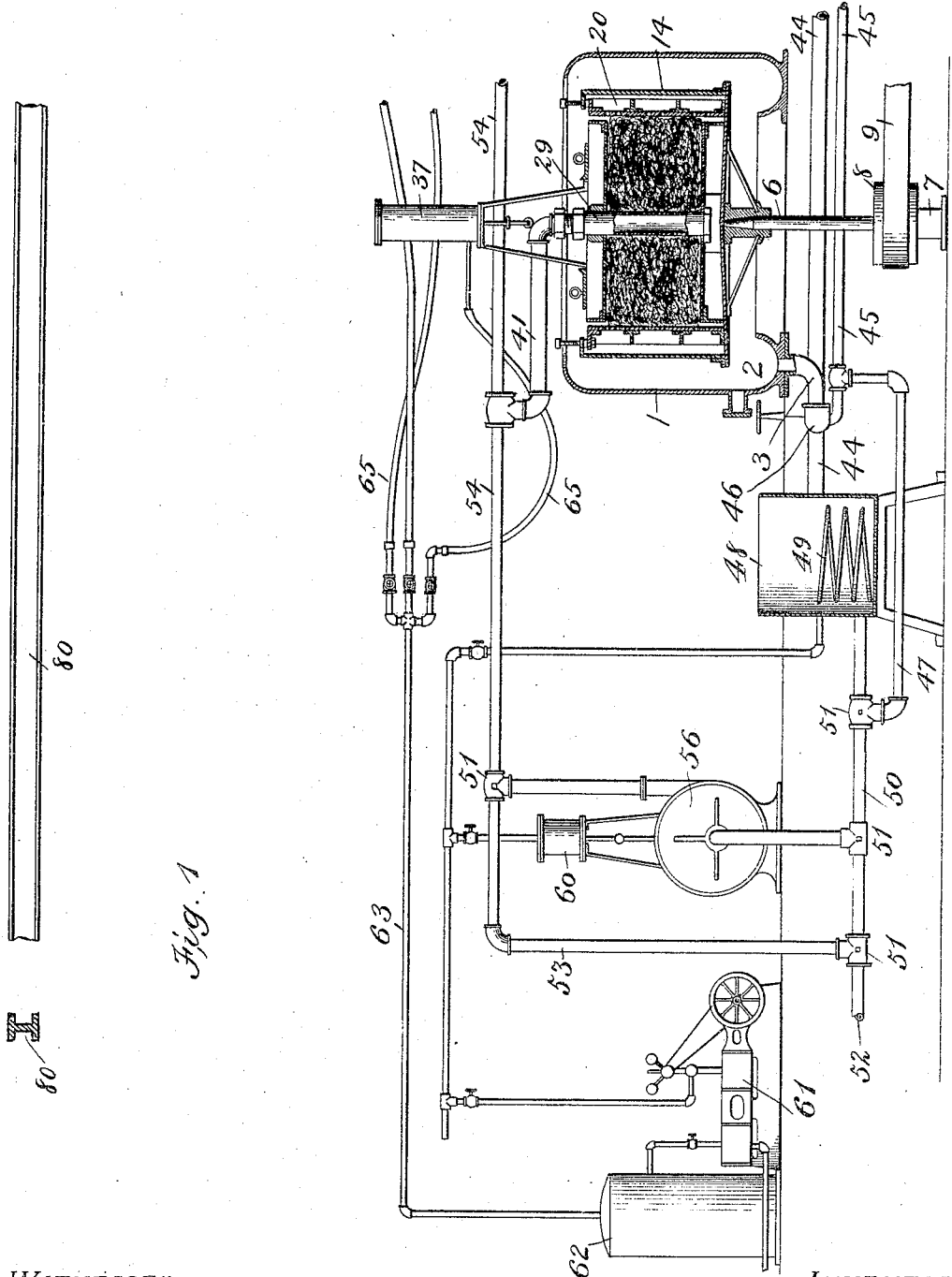

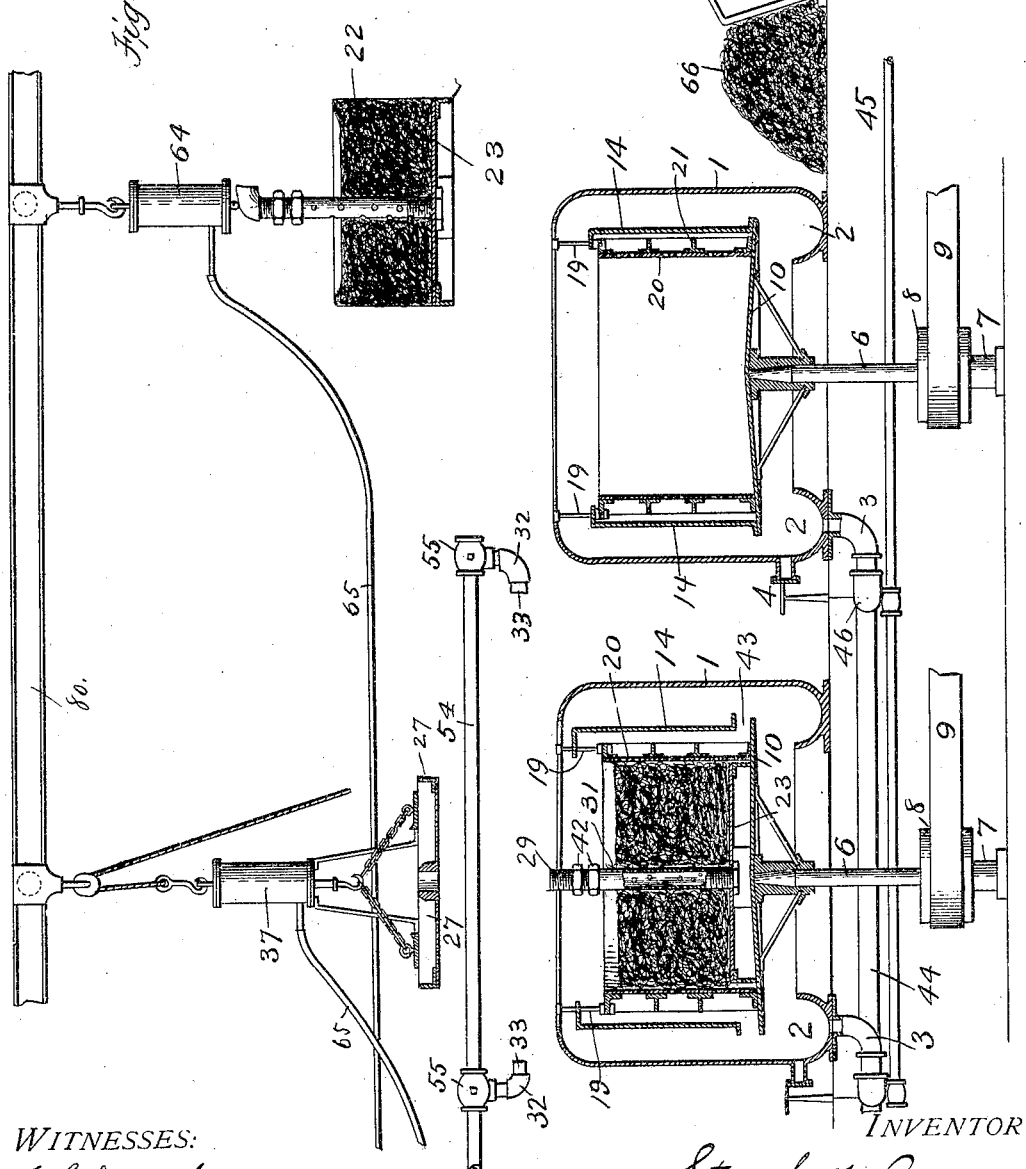

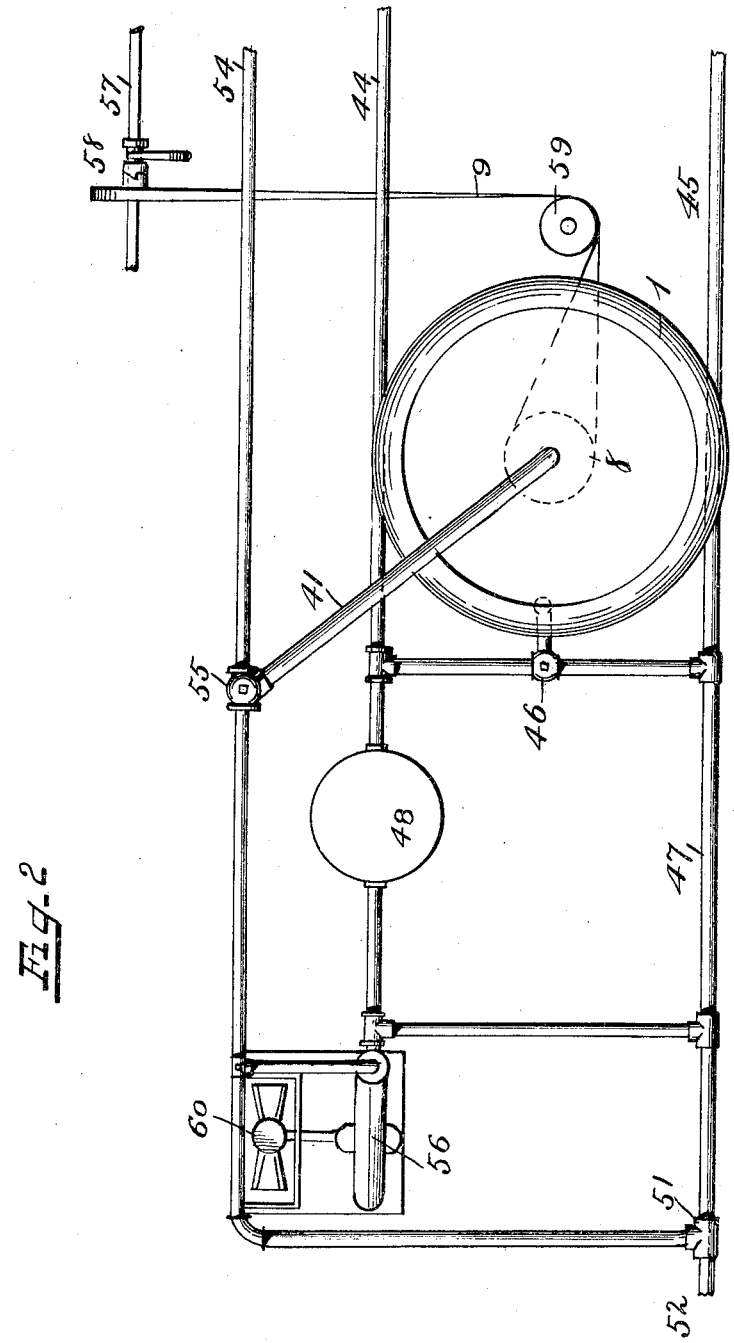

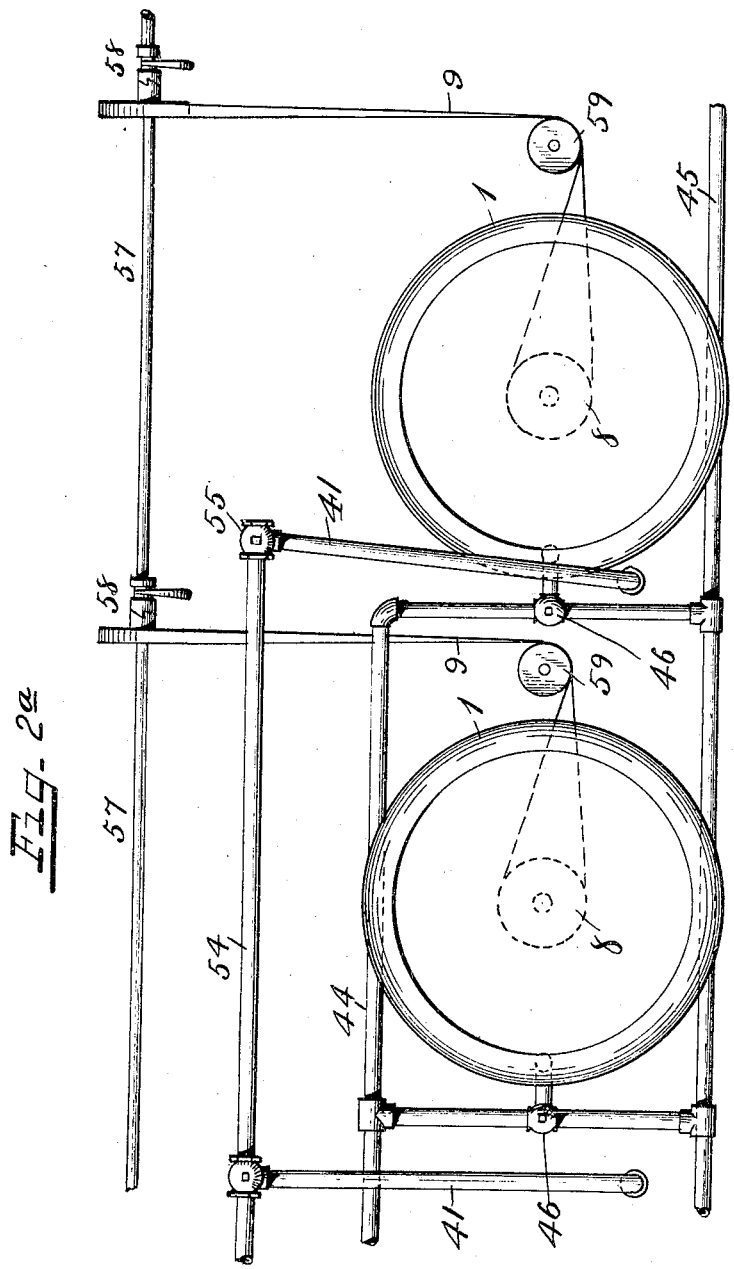

No. 793,510. PATENTED JUNE 27, 1905.
S. W. CRAMER.
MACHINE FOR DYEING, &c.
APPLICATION FILED MAR. 27, 1905.
9 SHEETS—SHEET 5.
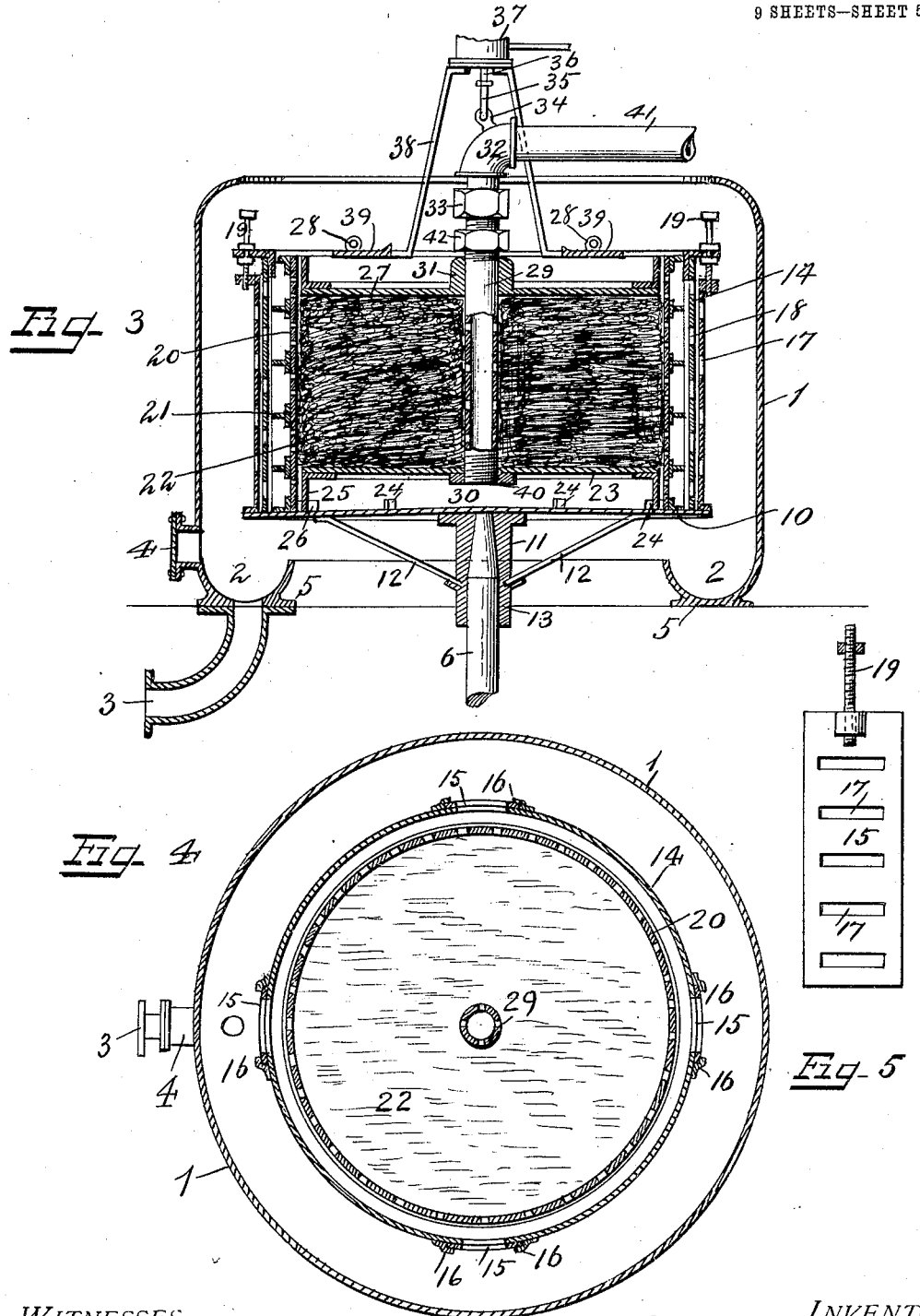
WITNESSES:
Franck L. Ormand
W. Parker Reinohl
INVENTOR
Stuart W. Cramer.
BY
D. C. Reinohl
Attorney

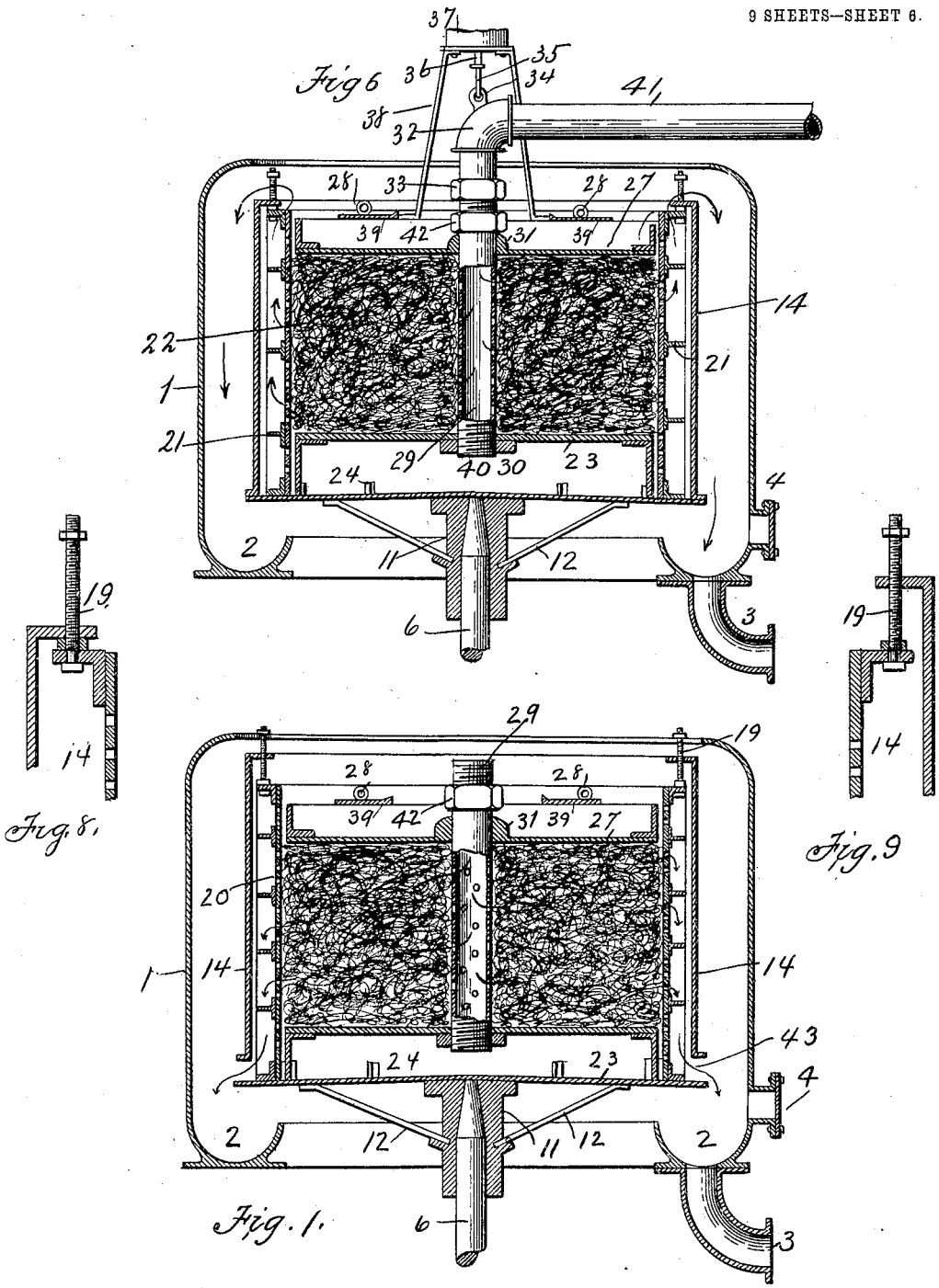

No. 793,510.  
PATENTED JUNE 27, 1905.  
S. W. CRAMER.  
MACHINE FOR DYEING, &c.  
APPLICATION FILED MAR. 27, 1905.

9 SHEETS—SHEET 7.

WITNESSES:  
INVENTOR  
Stuart W. Cramer.  
By D. L. Reinohl,  
Attorney

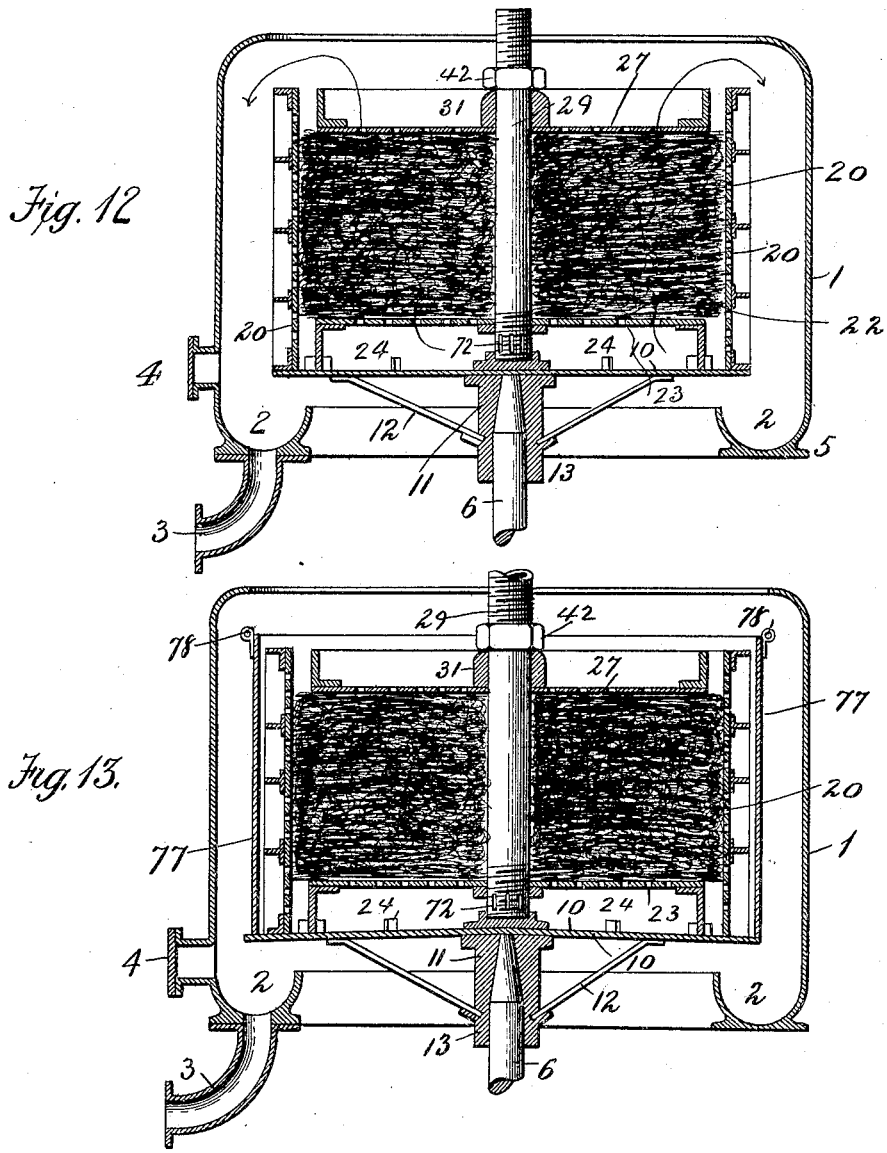

No. 793,510. PATENTED JUNE 27, 1905.
S. W. CRAMER.
MACHINE FOR DYEING, &c.
APPLICATION FILED MAR. 27, 1905.
9 SHEETS—SHEET 9.
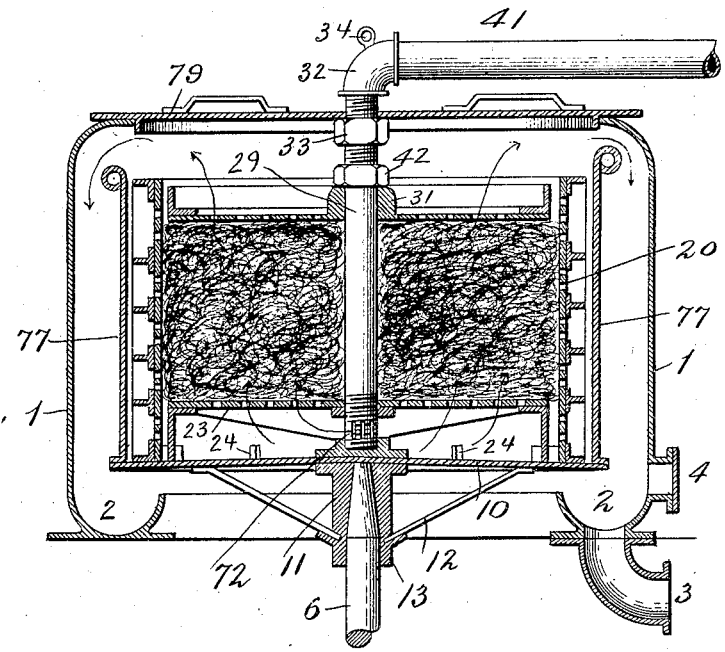
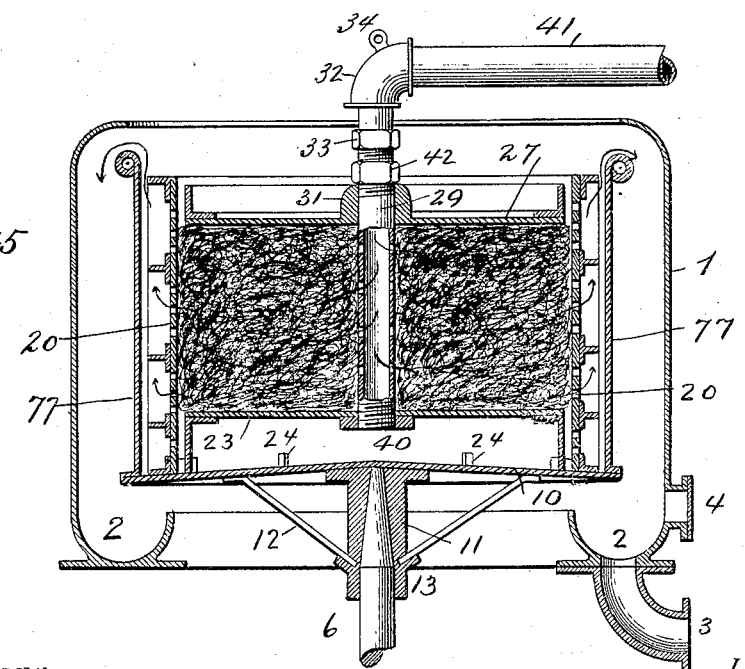
WITNESSES:
INVENTOR
Stuart W. Cramer.
By
D. E. Reinohl.
Attorney No. 793,510.

Patented June 27, 1905.

UNITED STATES PATENT OFFICE.

STUART W. CRAMER, OF CHARLOTTE, NORTH CAROLINA.

MACHINE FOR DYEING, &c.

SPECIFICATION forming part of Letters Patent No. 793,510, dated June 27, 1905.

Application filed March 27, 1905. Serial No. 252,355.

*To all whom it may concern:*

Be it known that I, STUART W. CRAMER, a citizen of the United States, residing at Charlotte, in the county of Mecklenburg and State of North Carolina, have invented certain new and useful Improvements in Machines for Treating Textile Materials; and I do hereby declare the following to be a full, clear, and exact description of the invention, such as will enable others skilled in the art to which it appertains to make and use the same.

My invention relates to the treatment of textile fibers and fabrics by dyeing, bleaching, washing, or cleansing and the removal of the water or the liquid therefrom either at intervals during the process or at its conclusion.

The purpose of this invention is to accomplish any or all of these results in one single machine, which therefore performs the functions of a combined dyer and centrifugal machine, thereby condensing into one machine the operations usually performed in two separate machines, with the attendant economy in both time and labor. It is believed that better results will be obtained where the several operations are carried on in one single machine than when divided into two separate machines, because of the element of quickness and celerity of operation that is thereby possible, for in many cases these operations should follow each other with the least possible interval between them to insure the best results.

It is well known to users of the usual types of centrifugal machines that the batch of material must be removed by hand. At the same time I am aware that such machines have been made permitting the loaded basket to be inserted and removed at will, and I am aware that cylinder or tank types of machines in which the cotton is contained under pressure, with means for circulating the liquor through it and the subsequent removal of the material from the machine bodily, are by no means new in the state of this art, and I am also aware that machines have been used in this art whereby the material to be treated has been loaded in a basket under pressure and inserted in a cylinder provided with means for circulating the liquor through it and that the load has then been hoisted out of the machine and set into another machine centrifugally operated, where the liquor has been thereby extracted from it; but in my invention it is proposed to conduct these operations in one and the same machine without removal of the material within the basket or cage until the treatment is complete and the material is ready to be dried. Furthermore, I am aware that even this plan of treatment is not altogether new and has been accomplished with a greater or less degree of success.

My invention therefore consists in certain improvements in machines of this class whereby simplicity of construction is combined with increased capacity, economy of labor and materials, and excellence of results generally, which will be fully disclosed in the following specification and claims.

In the accompanying drawings, which form part of this specification, Figures 1 and 1$^a$ represent a vertical longitudinal section, partly in side elevation, showing a series or battery of three machines all connected to coöperate together with a single source of motive power and of compressed air and a single liquor containing and mixing tank and circulating-pump. Figs. 2 and 2$^a$ represent in plan the circulating system and the driving mechanism. Figs. 3, 6, 7, 10, 11, 12, 13, 14, and 15 represent vertical sections, partly in side elevation, of modified forms of the dyeing and centrifugal machines; Fig. 4, a plan of the machine shown in Fig. 3; Fig. 5, an elevation of the valve shown in Figs. 3 and 4; Figs. 8 and 9, details of the vertically-movable cylinder shown in Figs. 6 and 7.

Similar characters refer to similar parts throughout the several views.

Reference being had first to Figs. 3, 4, and 5, which illustrate in vertical transverse section, in plan, and detail the preferred form of the individual machine and the designating characters thereon, 1 indicates an outer casing or "curb," as it may be termed, open at both top and bottom and terminating at the bottom in a circular inside annular gutter or bilgeway 2, with a discharge-spout 3, and fitted with a hand-hole clean-out 4. This outer casing rests on flanged supports 5 entirely separate and independent of the internal parts comprising the machine. 6 indicates a vertical spindle supported in a step-bearing 7. (Shown in detail in Fig. 10.) This step-bearing is the well-known loose-sleeve type. On the vertical spindle is fastened the hub-pulley 8, as shown in detail in Fig. 10, driven by a belt 9. On the upper end of the vertical spindle is an imperforate disk or circular bottom 10, which is rigidly secured by means of a clamp-coupling 11 and additionally secured by the spider 12 and by the clamp-coupling 13. This imperforate circular bottom is free to revolve on the spindle 6 and, as already stated, entirely separate from the outer casing 1 and its parts. On the outer edge of the imperforate circular bottom a vertical cylinder 14 is secured, around the circumference of which a plurality of gridiron-valves 15 are fitted. These gridiron-valves are of the well-known type shown in detail in Fig. 5, in which the valves slide vertically within grooves or ways 16 and in which the openings 17 open or close, as the case may be, the corresponding openings 18 in the cylinder thereby permitting the escape of the liquor when the valve is in its raised position and preventing its escape when the valve is lowered. Any means may be provided for raising and lowering the valves, such as by a screw movement 19, as shown, or by any equivalent device. 20 indicates a perforated inner cylinder or "basket," as it may be termed, of a less diameter than the outer cylinder 14, strengthened to withstand the stresses due to centrifugal action by the ribs 21. This basket is also made fast to the imperforate bottom 10. There is sufficient space between the cylinder 14 and the basket 20 so that when the gridiron-valves are closed liquor may rise between them and overflow the sides of the cylinder 14 into the bilgeway 2. The material 22 to be treated rests on a supplemental removable bottom 23, which has slots 24 around the under side of the angle-iron constituting its edge 25. These slots 24 fit down over ribs 26, arranged to correspond thereto on the upper face of the imperforate circular bottom 10, thereby clutching or coupling the two bottoms together, so that one revolves with the other. 27 is a cover fitted down on the material to be treated, so that when pressure is applied to the cover the material is maintained in a compressed condition. The cover is fitted with hooks 28, by which it can be removed at will. Pressure is applied to the cover by means of a spindle or other mechanical equivalent connecting the bottom with the cover and the pressure applied either by mechanical means through the medium of a fluid-operated piston or by hand with a screw or cam motion, the former or mechanical method preferred. 29 represents such a spindle, fastened to the bottom 23 by means of a screwed flange 30 and extending upward through an opening in the cover 27 within the flanged center 31. To the upper end of the spindle a combination-fitting 32 is secured by means of a union 33, either screwed or clamped. On the upper end of this combination-fitting is a ring 34, with which a hook 35 engages, which is attached to the piston-rod 36 of a fluid-operated motor 37. The legs 38 of the fluid-operated motor rest on the cover 27 against lugs 39, which hold them firmly in position. It is evident, therefore, that compression is secured on the material by operating the fluid-actuated motor 37, the piston 36 of which is held in place by the hook 35 engaging the ring 34 on the spindle 29 and causing the legs 38 of the motor to force down the cover 27 to a position corresponding to the amount of predetermined pressure desired and maintained in the motor. The vertical spindle 29 performs the double function of a spindle and a distributing-pipe. It will be noticed where it is shown partly in section that it is perforated to allow the escape of the liquor radially through the material and that the lower end of it is plugged at 40 to prevent the escape of the liquor. 41 indicates a pipe to supply (or remove) the liquor, as the case may be, and is screwed or clamped into the combination-fitting 32, attached to the upper end of the combination spindle and distributing-pipe 29. 42 represents a lock or clamp nut.

Refer next to Figs. 6, 7, 8, and 9, which show transverse sections, partly in side elevation, of a modified form of the machine, in which the outer cylinder 14 is raised bodily by a plurality of the same screw lifting devices 19, thereby permitting the escape of the dye liquor through an opening 43, extending all the way round at the bottom, in lieu of opening gridiron-valves and permitting the liquor to escape, as previously described.

Referring again to Figs. 1 and 1ª and Figs. 2 and 2ª, as already explained, these four drawings are to be construed together and show a series or battery of three machines, all connected to coöperate together, with the necessary pumps, hoists, and other rigging for their proper operation. Any one of the operations can be performed in each machine at the same time or in rotation, as shown. The first machine, (shown on Fig. 1,) for instance, represents it in the process of dyeing, washing, boiling out, &c., the liquor being circulated through the material to be treated. The second machine of the series (shown on the left-hand side of Fig. 1ª) represents it in process of extracting the liquor from the material, and the third machine (shown on the right-hand side of Fig. 1ª) represents the unloading of the machine by lifting the batch of material out. In the circulating system of piping, 44 represents the liquor return-pipe and 45 the liquor or wash-water pipe, emptying into a sewer or other suitable place. 46 is a three-way cock or valve by which each machine is connected at will either to the return-pipe 44 or to the waste-pipe 45, this valve being operated by an extensible handle extending through the floor, by a wrench, or other suitable device. 47 represents a by-pass from the waste-pipe around the liquor storage and mixing tank 48, equipped with a heating-coil 49. 50 indicates a pipe connecting the circulating-pump 56 with the liquor-mixing tank 48, and 51 represents three-way valves for the proper handling of the liquor or wash-water, as the case may be, for the different operations. 52 is a by-pass around the circulating-pump to the main distributing-pipe 54 of the circulating system. 55 represents three-way cocks for connecting the branch pipes 41 with the main distributing-pipe 54. 57 represents a source of power, such as a shaft with a clutch-pulley 58 attached, which drives the machine for extracting purposes through the belt 9, around the idler-pulley 59, and driving on the drum-pulley 8, as previously described. 60 represents a direct-connected engine or other equivalent source of power for driving the circulating-pump 56. 61 represents an air-compressor, which may be of any approved type, for delivering a uniform predetermined pressure into a receiver 62, from which compressed air is taken through an air-main 63 to the fluid-operated motors 37 and 64. Of these fluid-operated motors, as already explained, 37 is for compressing the batch of material to be dyed in the process of dyeing and maintaining thereon a uniform and constant predetermined pressure. It is also used, as shown in Fig. 2ª, for lifting off the cover in preparing to unload. 64 is a similar operated motor for lifting out the batch when the operation of dyeing is completed. 65 represents air-hose for connecting to the air-lifts or motor. 66 represents the pile of material where it is dumped after having been unloaded from the machine. 67 is an automatic feeder to an automatic stock-drier 68, into which the material is placed to be dried and conveyed elsewhere for subsequent operations. 80 indicates a rail or track, of ordinary construction, on which the cylinders 37 and 64 are suspended and on which the cover 27 and the material 22 can be moved to any desired place.

With the preceding description the operation may be briefly described as follows: The material to be treated is placed in the machine on the supplemental bottom 23. The cover 27 is placed on it, with the fluid-operated motor 37 in position. The branch circulating-pipe 41 is swung into place and clamped or otherwise fastened to the fitting 32. The circulating-pump 56 is started into operation, receiving liquor or wash-water through the pipe 52 until a sufficient quantity has been taken in to fill the circulating system, the machine, and the mixing-tank 48. The circulation is continued, the liquor passing from the pump through the discharge-main 54, thence through the branch main 41 to the central spindle or discharge-pipe 29, from which it issues radially, thence through the material to be treated, and thence through the perforated basket 20 into the space between it and the cylinder 14. From this space the liquor rises and overflows over the side of the cylinder 14, down into the bilgeways 2, and out through the waste-pipe 3 into the liquor-return pipe 44, thence into the mixing and receiving tank 48, from which it is drawn from the pipe 50 by the circulating-pump 56 and again started on its cycle of circulation, as before. When the operation has progressed far enough, the fluid-operated motor is lifted clear and out of the way by a light hoist or other means and the lock-nut 42 screwed down onto the solid core 31 of the cover 27, thereby holding it securely in place. By the screws 19 the cylinder 14 is lifted enough to allow ample space 43 for the exit of the liquor between the lower edge of it and the bottom 10. By means of the centrifugal clutch 58 power is applied through the belt 59 and the drum-pulley 8 to the vertical spindle 6, by which the whole internal part of the machine is revolved at a high rate of speed, as usual in centrifugal machines for liquor-extracting purposes. The liquor is thrown out through the perforations in the basket 20 and follows down between it and the outer raised cylinder 14 and thence out through the space 43 into the bilgeways 2 and thence down into the return-pipe 44 to the mixing-tank 48. It is either left there or returned to the storage-tank for future use. Water can now be turned into the machine by a hose and washing done in the manner usual in hydro-extractors or by shutting off the machines with the three-way valves 46. Wash-water may be passed through the machine by means of the regular circulating system of piping and the by-pass 47 around the mixing-tank 48, the wash-water being used over as many times as desired or wasted direct to a sewer through the waste-pipe 45, as circumstances require. In exactly the same manner as before the wash-water is extracted by centrifugal action from the material, which is then ready to be hoisted out and taken to the driers, as shown and previously mentioned, or in case it is desired to oxidize the material after dyeing, such as in the case of a sulfur color, after the first extraction air under pressure can be turned into the circulating-pipes and forced through the material in exactly the same manner as in the circulation of the liquor for dyeing, washing, or other purposes.

It is obvious that many details of this apparatus may be modified without materially departing from the spirit of my invention. It is also obvious that any number of machines may be connected in series and any number of pumps, mixing and storage tanks for handling connected therewith, the whole forming a complete system of machines cooperating together or acting singly to perform the various functions required in the treating of textile fibers, fabrics, &c. Feasible modifications of these machines are shown in Figs. 10, 11, 12, 13, 14, and 15, in which—

Figure 11:
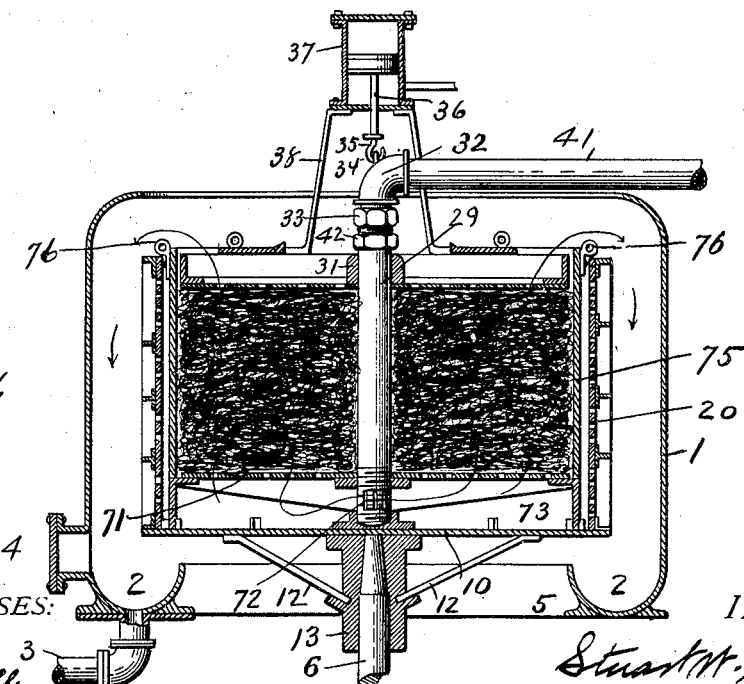

Fig. 10 shows a machine in which the dye liquor is forced into a hollow cover 69, with an imperforate top and sides and a perforated lower side 70, from which it issues passing downward through the material to be dyed and thence out through a perforated supplemental bottom 71 and on to the regular bottom 19, from which it runs over into the bilgeways 2, and thence continues as previously described. Fig. 11 shows a similar system of circulation, but exactly reversed, the dye liquor being forced in through the branch pipe 41, as before, and then down through the hollow spindle 29, from which it issues radially through slits 72 into a space 73, formed between the imperforate bottom 10 and the supplemental perforated bottom 71. From this space the liquor rises through the material to be treated and thence through the perforated cover 74 and flows over the side of the bilgeways 2 and is conducted off, as before. In both Figs. 10 and 11 the perforated basket 20 is exactly as in the first and preferred forms of the machines; but in order to prevent the liquor from issuing through the perforations in the basket and to force it to continue in its circulation through the material an inside cylinder 75 is substituted to take the place of the cylinder 14 in the first and preferred forms of the machine shown. This cylinder is peculiar in so far that it is removable and is provided with hooks or eyebolts 76, by which it can be lifted out.

Fig. 12 shows the same form of machine from which the cylinder 75 has been removed for extraction in the usual manner. As it is obvious that in this case the material to be treated would by centrifugal action be thrown out against the wall of the basket 20 and it would be impracticable to get the imperforate inner cylinder 75 back in place, a substitute cylinder 77 is used, as shown in Fig. 13, also provided with rings 78 around the top for handling. It is obvious, therefore, that the circulation of the wash-water can still be conducted as in Fig. 11 and quite satisfactorily enough for its purpose, after which the outer imperforate cylinder 77 can again be removed and the remaining wash-water extracted by centrifugal action, as before and as shown in Fig. 12.

Fig. 14 shows the same machine as Fig. 13, with a split cover 79 placed over the top of the outer casing or curb 1 for the purpose of "steaming." It is obvious that steam turned into the branch pipe 41 instead of liquor or wash-water would circulate in exactly a similar manner, the surplus escaping through the opening below the bottom 10 after having passed completely through the material and then thence over and down the sides between the cylinder 77 and the curb or outer casing 1.

Fig. 15 shows a modification of both the general types previously shown, in that the circulation is radial instead of from top to bottom, and it is fitted with an outer cylinder 77, which can be lifted and removed bodily from the machine during the process of extraction.

Having thus fully described my invention, what I claim is—

1. In a machine for treating textile material, a stationary casing or curb; a spindle, means for revolving the spindle, an imperforate disk or bottom attached to said spindle, a perforated cylinder or basket affixed to said disk or bottom, and an imperforate revoluble cylinder concentric with the basket and supported on the bottom thereof.

2. In a machine for treating textile material, a stationary casing or curb; a spindle, means for revolving the spindle; an imperforate disk or bottom attached to said spindle; a perforated cylinder or basket affixed to said disk or bottom; and an imperforate revoluble cylinder of greater diameter and concentric with the basket and supported on the bottom thereof.

3. In a machine for treating textile material, a stationary casing or curb; a spindle, means for revolving the spindle; an imperforate disk or bottom attached to said spindle; a perforated cylinder or basket affixed to said disk or bottom; and an imperforate revoluble cylinder of less diameter and concentric with the basket and supported on the bottom thereof.

4. In a machine for treating textile material, a stationary casing or curb; a spindle, means for revolving the spindle; an imperforate disk or bottom rigidly attached to said spindle; a perforated cylinder or basket resting on said disk or bottom and firmly affixed thereto; an imperforate revoluble cylinder of greater diameter and concentric with the basket and supported on the bottom thereof, and means for allowing the escape of fluid from said cylinder.

5. In a machine for treating textile material, a stationary external casing or curb; a spindle, means for revolving the spindle; an imperforate disk or bottom rigidly attached to said spindle; a perforated cylinder or basket resting on said disk or bottom and firmly affixed thereto; and an imperforate cylinder of greater diameter and concentric with the basket, affixed to said disk or bottom, and provided with a plurality of openings for the escape of the fluid, and means for closing said openings.

6. In a machine for treating textile material, a stationary external casing or curb; a spindle; means for revolving the spindle; an imperforate disk or bottom rigidly attached to said spindle; a perforated cylinder or basket resting on said disk or bottom and firmly affixed thereto; an imperforate cylinder of greater diameter and concentric with the basket, affixed to said disk or bottom, and provided with a plurality of openings for the escape of the fluid, means for closing said openings; and a supplemental and removable bottom supporting the material to be treated.

7. In a machine for treating textile material, a stationary external casing or curb; a spindle, means for revolving the spindle; an imperforate disk or bottom rigidly attached to said spindle; a perforated cylinder or basket resting on said disk or bottom and firmly affixed thereto; an imperforate cylinder of greater diameter and concentric with the basket, affixed to said disk or bottom and provided with a plurality of openings for the escape of the fluid, means for closing said openings; a supplemental and removable bottom supporting the material to be treated, with means for removing the supplemental removable bottom and the material treated thereon.

8. In a machine for treating textile material, a stationary external casing or curb; a spindle, means for revolving the spindle; an imperforate disk or bottom rigidly attached to said spindle; a perforated cylinder or basket resting on said disk or bottom and firmly affixed thereto; an imperforate cylinder of greater diameter and concentric with the basket, affixed to said disk or bottom, and provided with a plurality of openings for the escape of the fluid, and means for closing the openings; a supplemental and removable bottom supporting the material to be treated, means for removing the supplemental removable bottom, and the material treated thereon; a cover, and means for applying compression to the material under treatment by pressure applied to said cover.

9. In a machine for treating textile material, a stationary external casing or curb; a central spindle, means for revolving the spindle; an imperforate disk or bottom rigidly attached to said spindle; a perforated cylinder or basket resting on said disk or bottom and firmly affixed thereto; an imperforate cylinder of greater diameter and concentric with the basket, affixed to said disk or bottom, and provided with a plurality of openings for the escape of the fluid, and means for closing the openings; a supplemental and removable bottom supporting the material to be treated; a cover; and means for compressing the material under treatment by subjecting it to pressure between the cover and the supplemental bottom.

10. In a machine for treating textile material, a stationary external casing or curb; a central spindle, means for revolving the spindle; an imperforate disk or bottom rigidly attached to said spindle; a perforated cylinder or basket resting on said disk or bottom and firmly affixed thereto; an imperforate cylinder of greater diameter and concentric with the basket, affixed to said disk or bottom, and provided with a plurality of openings for the escape of the fluid, and means for closing the openings; a supplemental and removable bottom supporting the material to be treated; a cover; means for applying a yielding compression to the material under treatment by subjecting it to pressure between the cover and the supplemental bottom, and means for applying and maintaining a predetermined pressure.

11. In a machine for treating textile material, a stationary external casing or curb; a central spindle, means for revolving the spindle; an imperforate disk or bottom rigidly attached to said spindle; a perforated cylinder or basket resting on said disk or bottom and firmly affixed thereto; an imperforate cylinder of greater diameter and concentric with the basket, affixed to said disk or bottom, and provided with a plurality of openings for the escape of the fluid, and means for closing the openings; a supplemental and removable bottom supporting the material to be treated; a cover; and means for applying compression to the material under treatment by subjecting it to pressure between the cover and the supplemental bottom, and means for applying and maintaining said pressure; means for supplying fluid and circulating the same through the material under treatment, and means for withdrawing said fluid.

12. In a machine for treating textile material, a stationary external casing or curb; a supplemental and removable cover for said external casing; a central spindle, means for revolving the spindle; an imperforate disk or bottom rigidly attached to said spindle; a perforated cylinder or basket resting on said disk or bottom and firmly affixed thereto; an imperforate cylinder concentric with the basket; a supplemental and removable bottom supporting the material to be treated; a cover; and means for compressing the material under treatment by applying pressure to said cover; and means for supplying elastic fluid and circulating the same through the material under treatment.

In testimony whereof I affix my signature in presence of two witnesses.

STUART W. CRAMER.

Witnesses:
H. R. GRAHAM,
C. L. McLEAN.